United States Patent
Cui et al.

(10) Patent No.: US 10,187,437 B2
(45) Date of Patent: *Jan. 22, 2019

(54) MULTI-HOP SMALL CELL AUTO DISCOVERY FOR SOFTWARE DEFINED NETWORKING-ENABLED RADIO ACCESS NETWORK

(71) Applicant: AT&T Intellectual Property I, L.P., Atlanta, GA (US)

(72) Inventors: Zhi Cui, Sugar Hill, GA (US); Paul Edward Smith, Jr., Rockwall, TX (US); Mostafa Tofighbakhsh, Cupertino, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/645,235

(22) Filed: Jul. 10, 2017

(65) Prior Publication Data

US 2017/0310719 A1    Oct. 26, 2017

Related U.S. Application Data

(63) Continuation of application No. 14/823,634, filed on Aug. 11, 2015, now Pat. No. 9,705,949.

(51) Int. Cl.
*H04L 29/06* (2006.01)
*H04L 12/24* (2006.01)
(Continued)

(52) U.S. Cl.
CPC .......... *H04L 65/4076* (2013.01); *H04L 41/12* (2013.01); *H04L 45/02* (2013.01);
(Continued)

(58) Field of Classification Search
None
See application file for complete search history.

(56) References Cited

U.S. PATENT DOCUMENTS

| 6,496,484 B1 * | 12/2002 | Suzuki | H04L 45/00 370/254 |
| 2004/0143654 A1 * | 7/2004 | Poirot | H04L 41/085 709/223 |

(Continued)

FOREIGN PATENT DOCUMENTS

| AU | 2014101209 | 11/2014 |
| CN | 103327529 | 9/2013 |

(Continued)

OTHER PUBLICATIONS

"OpenFlow™-Enabled Mobile and Wireless Networks," ONF Solution Brief, Sep. 30, 2013, Open Networking Foundation.

(Continued)

*Primary Examiner* — Bunjob Jaroenchonwanit
(74) *Attorney, Agent, or Firm* — Hartman & Citrin LLC

(57) ABSTRACT

Concepts and technologies are described herein for multi-hop small cell auto discovery for software-defined networking ("SDN")-enabled radio access networks ("RANs"). According to one aspect of the concepts and technologies disclosed herein, a small cell RAN node can include a network backhaul link connected to a further small cell radio access network node operating within a RAN controlled, at least in part, by a SDN controller. The small cell RAN node can generate an enhanced OFDP multicast message that includes a SDN characteristic for the SDN controller to use, at least in part, to discover the small cell RA node as operational within the RAN. The small cell RAN node can send the enhanced OFDP multicast message over the network backhaul link in an attempt to provide the SDN (Continued)

characteristic to the SDN controller so SDN controller can discover the small cell RAN node as operational within the RAN.

20 Claims, 6 Drawing Sheets

(51) Int. Cl.
  *H04L 12/751* (2013.01)
  *H04L 12/715* (2013.01)
  *H04L 12/721* (2013.01)
  *H04L 12/717* (2013.01)
(52) U.S. Cl.
  CPC .............. *H04L 45/26* (2013.01); *H04L 45/42* (2013.01); *H04L 45/64* (2013.01)

(56) References Cited

U.S. PATENT DOCUMENTS

| | | | |
|---|---|---|---|
| 2013/0268686 A1 | 10/2013 | Wang et al. | |
| 2013/0322443 A1* | 12/2013 | Dunbar | H04L 12/185 370/390 |
| 2014/0362790 A1 | 12/2014 | McCann | |
| 2015/0023347 A1 | 1/2015 | Kapur et al. | |
| 2015/0043576 A1 | 2/2015 | Dixon et al. | |
| 2015/0163147 A1 | 6/2015 | Li et al. | |
| 2015/0195178 A1* | 7/2015 | Bhattacharya | H04L 45/745 718/1 |
| 2015/0296056 A1* | 10/2015 | Donley | H04L 69/167 709/245 |
| 2015/0326524 A1* | 11/2015 | Tankala | H04L 61/103 709/245 |
| 2015/0327148 A1* | 11/2015 | Agarwal | H04W 24/02 370/328 |
| 2016/0028603 A1* | 1/2016 | Chakrabarti | H04L 43/0852 370/252 |
| 2016/0072714 A1* | 3/2016 | Gan | H04L 41/00 709/238 |
| 2016/0072762 A1* | 3/2016 | Liang | H04L 45/56 709/245 |
| 2016/0119255 A1* | 4/2016 | Luo | H04L 49/557 370/218 |
| 2016/0150448 A1* | 5/2016 | Perras | H04W 48/17 455/450 |
| 2016/0197831 A1* | 7/2016 | De Foy | H04L 45/7453 370/392 |
| 2016/0205014 A1* | 7/2016 | Chen | H04L 45/28 370/216 |
| 2016/0205015 A1* | 7/2016 | Halligan | H04L 45/56 370/400 |
| 2016/0205071 A1* | 7/2016 | Cooper | H04L 12/6418 726/1 |
| 2016/0218973 A1* | 7/2016 | Anand | H04L 45/38 |
| 2016/0248511 A1* | 8/2016 | Wang | H04L 41/0803 |
| 2016/0248681 A1* | 8/2016 | Gal Or | G06F 9/505 |
| 2016/0330077 A1* | 11/2016 | Jin | H04L 41/0806 |
| 2016/0337231 A1* | 11/2016 | Dixon | H04L 12/184 |
| 2016/0337916 A1* | 11/2016 | Deenoo | H04W 8/22 |
| 2017/0034122 A1* | 2/2017 | Hoffmann | H04L 12/4641 |
| 2017/0034669 A1* | 2/2017 | Dronadula | H04W 4/06 |

FOREIGN PATENT DOCUMENTS

| | | |
|---|---|---|
| CN | 102546351 | 5/2014 |
| CN | 104253711 | 12/2014 |

OTHER PUBLICATIONS

Dely et al., "OpenFlow for Wireless Mesh Networks," Computer Communications and Networks (ICCCN), 2011 Proceedings of 20th International Conference on, 2011, IEEE.

Yang et al., "OpenRAN: A Software-defined RAN Architecture Via Virtualization," SIGCOMM '13, Aug. 12-16, 2013, pp. 549-550 vol. 43, No. 4, ACM, 2013.

U.S. Notice of Allowance dated Mar. 1, 2017 in U.S. Appl. No. 14/823,634.

* cited by examiner

MULTI-HOP SMALL CELL AUTO DISCOVERY FOR SOFTWARE DEFINED NETWORKING-ENABLED RADIO ACCESS NETWORK

CROSS-REFERENCE TO RELATED APPLICATIONS

This application is a continuation of and claims priority to U.S. patent application Ser. No. 14/823,634, entitled "Multi-Hop Small Cell Auto Discovery for Software Defined Networking-Enabled Radio Access Network," filed Aug. 11, 2015, now U.S. Pat. No. 9,705,949, which is incorporated herein by reference in its entirety.

BACKGROUND

In recent years, mobile telecommunications carriers have experienced a dramatic increase in traffic, particularly data traffic, on their networks, and this trend will likely continue. This increase in traffic has been caused in part by the increased adoption of smartphones and other devices that rely on mobile telecommunications networks, the migration of many customers from utilizing landline telecommunication services to utilizing mobile telecommunication services for their communications needs, and the use of multimedia such as streaming video, high-definition video games, and photo-intensive social media. To meet the demands of higher traffic and to improve the end user experience, mobile telecommunications carriers are examining mechanisms by which to improve network efficiency, network capacity, and the end user experience, while keeping operational costs at a level conducive to maintaining competitive rates for the services they provide.

Software-defined networking ("SDN") is an architectural framework for creating intelligent networks that are programmable, application aware, and more open. SDN provides an agile and cost-effective communications platform for handling the dramatic increase in data traffic on carrier networks by providing a high degree of scalability, security, and flexibility. SDN provides several benefits. SDNs can allow for the creation of multiple, virtual network control planes on common hardware. SDN can help extend service virtualization and software control into many existing network elements. SDN enables applications to request and manipulate services provided by the network and allow the network to expose network states back to the applications. SDN exposes network capabilities through application programming interfaces ("APIs"), making the control of network equipment remotely accessible and modifiable via third-party software clients, using open protocols such as OpenFlow, available from Open Network Forum ("ONF"). Third Generation Partnership Project ("3GPP") and other standards bodies and industry forums are currently working to standardize SDN for use in multiple aspects of future mobile telecommunications networks under fifth generation ("5G") standards. In part, the radio access network ("RAN") will be implemented using SDN concepts.

Future RANs will provide a greater level of densification with the deployment of small cells that utilize, for example, millimeter ("mm") wave spectrum to offer higher data rates and user throughput to meet the bandwidth demand expected for 5G services. In the mm-wave range, the cell size is much smaller and the number of these smaller cells needed will be much greater. A challenge of deploying such large numbers of small cells lies in operations, and in particular, how to deploy large numbers of small cells with automation instead of operations support system ("OSS") manual configuration. One important aspect of such operation is network discovery—that is, how added, deleted, or changed small cells can be automatically discovered to enable greater collaboration among cells. Existing small cells and macro cells can discover neighboring small cells by OSS manual configuration and/or by using RF signal detection. This method of discovery allows a cell to discover its immediate neighbor(s). Greater cross layer optimization can be achieved because SDN has a global abstraction of both wire and wireless networks.

While the industry is moving towards leveraging SDN for RAN due to the flexible/programmable common control and higher degree of collaboration among small cells, macro cells, and even among different radio technologies for the higher layer functions such as load balancing, mobility, interference mitigation, and the like, the existing localized network listening discovery or OSS manual configuration will no longer function. This is because many of the small cells are not immediately connected to the SDN controller and some are likely many hops away from the SDN controller.

SUMMARY

Concepts and technologies are described herein for multi-hop small cell auto discovery for SDN-enabled RANs. According to one aspect of the concepts and technologies disclosed herein, a network system can include a network backhaul, a SDN controller; and a RAN. The RAN can include a plurality of RAN nodes, including an intermediate RAN node and a new RAN node that was added to the RAN. The new RAN node can generate an enhanced OFDP multicast message that includes a SDN characteristic. The new RAN node can send the enhanced OFDP multicast message over the network backhaul in a first attempt to provide the SDN characteristic to the SDN controller so that the SDN controller can discover the new RAN node as operational within the RAN. The intermediate RAN node can receive the enhanced OFDP multicast message from the new RAN node via the network backhaul. The intermediate RAN node can forward the enhanced OFDP multicast message over the network backhaul in a second attempt to provide the SDN characteristic to the SDN controller so that the SDN controller can discover the new RAN node as operational within the RAN. The SDN controller can receive the multicast message and can update a topology table based, at least in part, upon the SDN characteristic included in the enhanced OFDP multicast message.

In some embodiments, the network backhaul is or includes a plurality of wired backhaul links. In some other embodiments, the network backhaul is or includes a plurality of wireless backhaul links. The network backhaul can include both wired and wireless backhaul links in other embodiments.

In some embodiments, the plurality of RAN nodes also includes a further intermediate RAN node. The further intermediate RAN node can receive the enhanced OFDP multicast message from the new RAN node via the network backhaul. The further intermediate RAN node can forward the enhanced OFDP multicast message over the network backhaul in a third attempt to provide the SDN characteristic to the SDN controller so that the SDN controller can discover the new RAN node as operational within the RAN. The network system can include any number of intermediate RAN nodes. The intermediate RAN node(s) can be or can include small cell RAN nodes, macro cell RAN nodes, or a combination thereof.

In some embodiments, the new RAN node is or includes a small cell node. In these embodiments, the small cell node can operate within a millimeter ("mm") wave frequency spectrum.

According to another aspect of the concepts and technologies disclosed herein, a small cell RAN node can include a network backhaul link connected to a further small cell radio access network node operating within a RAN controlled, at least in part, by a SDN controller. The small cell RAN node can generate an enhanced OFDP multicast message that includes a SDN characteristic for the SDN controller to use, at least in part, to discover the small cell RA node as operational within the RAN. The small cell RAN node can send the enhanced OFDP multicast message over the network backhaul link in an attempt to provide the SDN characteristic to the SDN controller so the SDN controller can discover the small cell RAN node as operational within the RAN. The small cell RAN node can include a transceiver that operates, for example, within a mm wave frequency spectrum.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
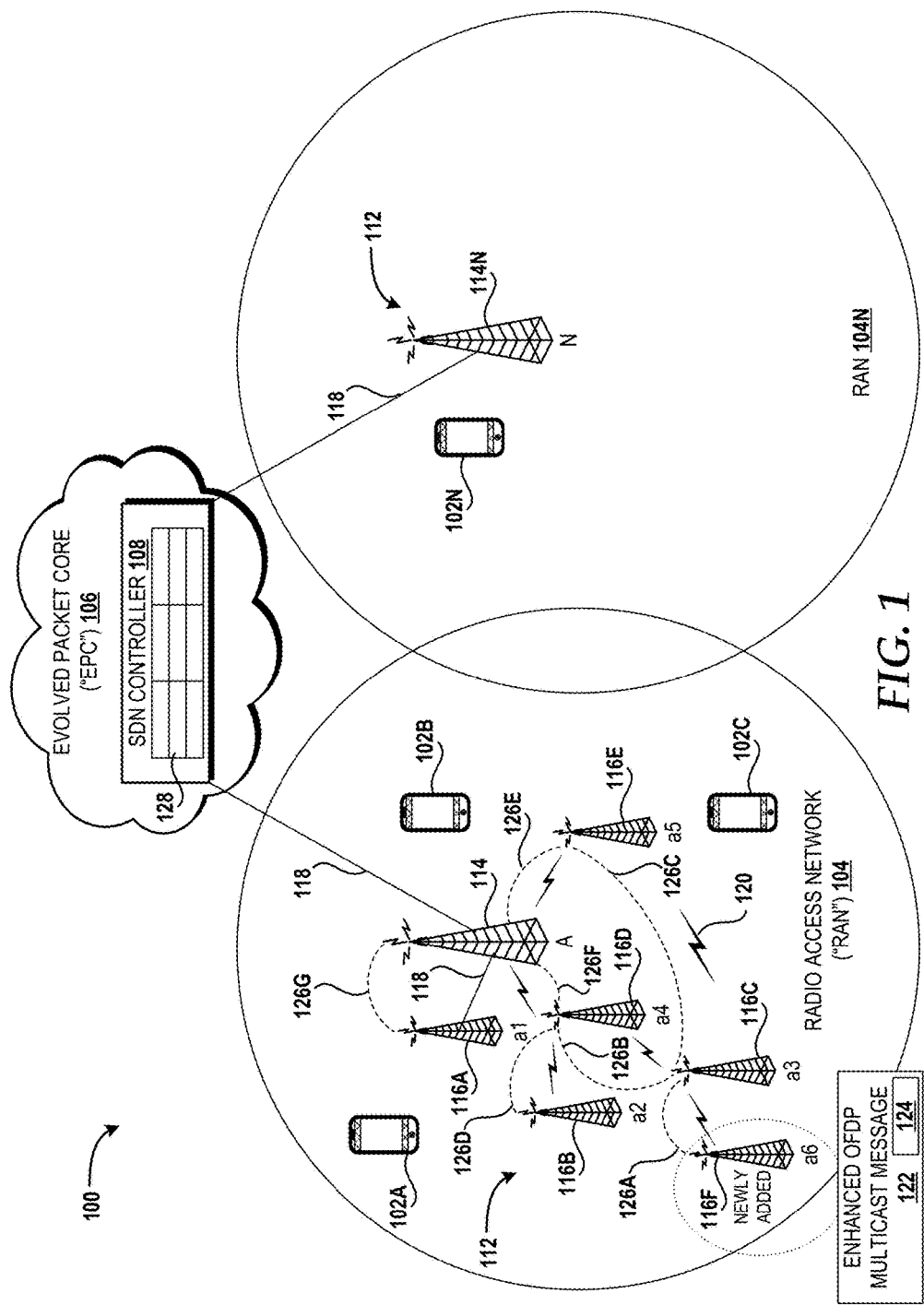
FIG. 1 is a block diagram illustrating aspects of an illustrative network system in which various aspects of the concepts and technologies disclosed herein can be implemented.

Concepts and technologies are described herein for multi-hop small cell auto discovery for SDN-enabled RANs. The concepts and technologies described herein leverage and enhance open flow discovery protocol ("OFDP") to solve the larger scaled network discovery and dynamic collaborative controls to enable dynamic programmability for various optimization practices. Multi-hop small cell auto discovery for SDN-enabled RANs can include in-band and out-of-band signaling.

According to one aspect of the concepts and technologies disclosed herein, each mobile network node, such as a small cell, a macro cell, a WI-FI access point ("AP"), or a SDN controller implements an OFDP agent. When a new RAN node, such as a small cell, is added to the RAN, the new RAN node sends an enhanced OFDP multicast message using an IP multicast address, which includes information such as IP address, radio access technology ("RAT"), location, power, and any other characteristics of the new RAN node that can be used by the SDN for intelligent mobility control and coordination among cells of the RAN. The new RAN node can send the enhanced OFDP multicast message over a wired or wireless backhaul link. Any intermediate RAN node that receives the multicast IP address can forward the enhanced OFDP multicast message to the next hop using the wired or wireless backhaul link. This process is repeated until the enhanced OFDP multicast message is received by the SDN controller. In response, the SDN controller can update a topology table based upon information included in the enhanced OFDP multicast message. In addition, a keepalive ("KA") message can be sent by the RAN nodes to inform the SDN controller of the status of various states of the RAN nodes. The concepts and technologies disclosed herein can be applied to optical network auto discovery functions. The concepts and technologies disclosed herein can be applied to RATs such as, but not limited to, 4G RATs, 5G RATs, WI-FI, and the like, because OFDP is link layer independent.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, example aspects of traffic steering across cell-types will be presented.

Referring now to FIG. 1, aspects of an illustrative network system 100 in which various aspects of the concepts and technologies disclosed herein can be implemented will be described. It should be understood that the operating environment 100 and the various components thereof have been greatly simplified for purposes of discussion. Accordingly, additional or alternative components of the operating environment 100 can be made available without departing from the embodiments described herein.

The operating environment 100 shown in FIG. 1 includes a plurality of user equipment ("UE") devices 102A-102N (hereinafter referred to collectively or generally as "UEs 102") that are each capable of connecting to and communicating with one or more radio access networks ("RANs") 104-104N (hereinafter referred to collectively or generally as "RANs 104") to carry out voice and/or data communications with one or more other UEs, computers, servers, networking devices, and/or other networks (not shown). Each of the UEs 102 may be a cellular phone, a feature phone, a smartphone, a mobile computing device, a tablet computing device, a portable television, a portable video game console, or any other computing device that includes one or more radio access components that are capable of connecting to and communicating with one or more of the RANs 104 via one or more communications components (best shown in FIG. 5). Each of the RANs 104 can include a plurality of cells. As used herein, a "cell" refers to a geographical area that is served by one or more base stations operating within a RAN. As used herein, a "base station" refers to a radio receiver and/or transmitter (collectively, transceiver) that is/are configured to provide a radio/air interface over which one or more of the UEs 102 can utilize one or more communications components to connect to a network, such as an evolved packet core ("EPC") network 106. A base station can include one or more base transceiver stations ("BTSs"), one or more Node-Bs, one or more eNode-Bs, one or more home eNode-Bs, one or more wireless access points ("APs"), one or more multi-standard metro cell ("MSMC") nodes, and/or other networking nodes that are capable of providing a radio/air interface regardless of the technologies utilized to do so. A base station can be in communication with one or more antennas (not shown), each of which may be configured in accordance with any antenna design specifications to provide a physical interface for receiving and transmitting radio waves to and from one or more devices, such as the UEs 102 and, according to embodiments, each other.

The cells within the RANs 104 can include the same or different cell sizes, which may be represented by different cell-types. A cell-type can be associated with certain dimensional characteristics that define the effective radio range of a cell. Cell-types can include, but are not limited to, a macro cell-type, a metro cell-type, a femto cell-type, a pico cell-type, a micro cell-type, wireless local area network ("WLAN") cell-type, a MSMC cell-type, and a white space network cell-type. For ease of explanation, a "small cell" cell-type is utilized herein to collectively refer to a group of cell-types that includes femto cell-type (e.g., home eNode-B), pico cell-type, and micro cell-type, in general contrast to a macro cell-type, which offers a larger coverage area. Other cell-types, including proprietary cell-types and temporary cell-types are also contemplated.

A cell-type can additionally represent the radio access technology ("RAT") utilized by a cell. A RAT can be or can include technologies that operate in accordance with one or more mobile telecommunications standards including, but not limited to, Global System for Mobile communications ("GSM"), Code Division Multiple Access ("CDMA") ONE, CDMA2000, Universal Mobile Telecommunications System ("UMTS"), Long-Term Evolution ("LTE"), Worldwide Interoperability for Microwave Access ("WiMAX"), other 802.XX technologies, and/or the like. A RAT can utilize various channel access methods (which may or may not be used by the aforementioned standards), including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Single-Carrier FDMA ("SC-FDMA"), Space Division Multiple Access ("SDMA"), and the like to provide a radio/air interface to the mobile device 102. Data communications can be provided in part by a RAN using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies. Moreover, a RAN may be a GSM RAN ("GRAN"), a GSM EDGE RAN ("GERAN"), a UMTS Terrestrial Radio Access Network ("UTRAN"), an evolved UTRAN ("E-UTRAN"), any combination thereof, and/or the like.

In addition to the aforementioned second generation ("2G"), third generation ("3G"), and fourth generation ("4G") RATs, the RANs 104 disclosed herein can operate in accordance with current draft fifth generation ("5G") specifications and official 5G specifications as these become available. For example, the RANs 104 can utilize base stations that operate within a millimeter ("mm")-wave frequency spectrum. In some embodiments, the RANs 104 can provide a pool of wireless spectrum resources that can be controlled by a SDN controller 108 operating within or in communication with the EPC network 106. Although the SDN controller 108 is illustrated as operating within the EPC network 106, the SDN controller 108, or at least a portion thereof, can operate within one or more of the RANs 104. Moreover, in some embodiments, each of the RANs 104 might have an associated SDN controller 108.

The EPC network 106 can include a serving gateway ("SGW") function, packet data network ("PDN") gateway ("PGW") function, or a combination S/PGW function, a mobility management entity ("MME"), and a home subscriber server ("HSS"). The SGW function can serve the UEs 102 by routing incoming and outgoing IP packets. The SGW function also can provide an anchor point for intra-LTE mobility (e.g., handover between eNodeBs operating within the RANs 104) and an anchor point between the RANs 104. The PGW function can interact with the EPC network 106 and one or more PDNs (not shown). The PDN gateway function also performs IP address/IP prefix allocation, policy control, and charging operations. The MME controls signaling related to mobility and security for E-UTRAN access, such as via the RANs 104, by the UEs 102. The MME can track and page the UEs 102 in idle-mode. The HSS is a database that contains user/subscriber information. The HSS also performs operations to support mobility management, call and session setup, user authentication, and access authorization.

The SDN controller 108 can, on-demand, allocate wireless spectrum resources to a plurality of RAN nodes 112 operating within the RANs 104. In the illustrated embodiment, the plurality of RAN nodes 112 operating within the RAN 104 includes a macro cell node ("A") 114 and a plurality of small cell nodes 116A-116F ("a1" through "a6"). The RAN 104N includes another macro cell node ("N") 114N. The macro cell node A 114 and the plurality of small cell nodes 116A-116F can be connected via a wired backhaul 118 and/or a wireless backhaul 120, examples of each are labeled in the illustrated embodiment. The wired backhaul 118 can be or can include one or more physical links made, at least in part, of fiber-optic cabling, coaxial cabling, twisted pair cabling, or some combination thereof. It should be understood that these types of physical linkage are merely exemplary and other types of physical linkage may be used to connect at least a portion of the plurality of RAN nodes 112 operating within the RANs 104. The wireless backhaul 120 can be or can include one or more radio links operating, at least in part, in accordance with one or more RAT such as, for example, one or more of the illustrative RATs described above. It also should be understood that these types of radio links are merely exemplary and other types of radio links may be used to connect at least a portion of the plurality of RAN nodes 112 operating within the RANs 104.

The SDN controller 108 can utilize OpenFlow protocols, available from Open Networking Foundation, to control operations performed by the plurality of RAN nodes 112 operating within the RANs 104. The SDN controller 108 can utilize OpenFlow discovery protocol ("OFDP") to discover RAN nodes added to the RANs 104. In some implementations, the RANs 104 can provide a greater level of densification with the deployment of small cell nodes that utilize, for example, mm-wave spectrum to offer higher data rates and user throughput to meet the bandwidth demand expected for 5G services. In the mm-wave range, the cell size is much smaller and the number of these smaller cells needed will be much greater. A challenge of deploying such large numbers of small cells lies in operations, and in particular, how to deploy large numbers of small cells with automation instead of operations support system ("OSS") manual configuration. The concepts and technologies disclosed herein leverage and enhance existing OFDP to solve this larger scaled network discovery problem. Although the concepts and technologies disclosed herein are particularly useful for implementations in which the density of cells is high, such as in small cell nodes that operate within mm-wave frequency spectrum, the concepts and technologies disclosed herein are equally applicable to other cell-types disclosed herein.

After a small cell node is added to the RAN 104, the SDN controller 108 is tasked with discovering the node as operational within the RAN 104. In the illustrated example, the small cell node 116F is newly added to the RAN 104. When the small cell node 116F is added to the RAN 104, the small cell node 116F can generate an enhanced OFDP multicast message 122 using an IP multicast address. In current form, OFDP provides support for Ethernet and L2 multicast. The concepts and technologies described here extend the OFDP to support IP multicast over wireless and wireline. The enhanced OFDP multicast message 122 can include information referred to herein as SDN characteristics 124. The SDN characteristics 124 can be or can include IP address, RAT, location, power, and any other characteristics of the small cell node 116F. Similarly, any other RAN nodes added to the RANs 104 can generate similar messages including SDN characteristics such as those described above but particular to the characteristics thereof.

The small cell node 116F can send the enhanced OFDP multicast message 122 over the wired backhaul 118 and/or the wireless backhaul link 120. Any intermediate RAN node that receives the enhanced OFDP multicast message can forward the enhanced OFDP multicast message 122 to the next hop using other links of the wired backhaul 118 and/or the wireless backhaul link 120. In the illustrated example, the small cell node 116F can send the enhanced OFDP multicast message 122 to the small cell node a3 116C, which acts as an intermediate RAN node, via one of a plurality of hops 126A-126G. The small cell node a3 116C, in turn, can forward the enhanced OFDP multicast message 122 to the small cell node a4 116B via hop 126B and the small cell node a5 116E via the hop 126C. This process is repeated until the enhanced OFDP multicast message 122 is received by the SDN controller 108. In response, the SDN controller 108 can update a topology table 128 based upon the SDN characteristic(s) 124 included in the enhanced OFDP multicast message 122. The topology table 128 is illustrated in greater detail in FIG. 3 and will be described with an example data set herein below with reference to that FIGURE.

In some embodiments, a RAN node added to the RAN 104 can additionally generate a keepalive ("KA") message (not shown in the illustrated embodiment) and can send the KA message to the SDN controller 108 to inform the SDN controller 108 of the status of the RAN node. For example, the KA message can indicate whether the RAN node is operating in an "ON" state or is currently in an "OFF" state. In response, the SDN controller 108 can update the topology table 128 to reflect any changes in status of the RAN node.

Figure 2:
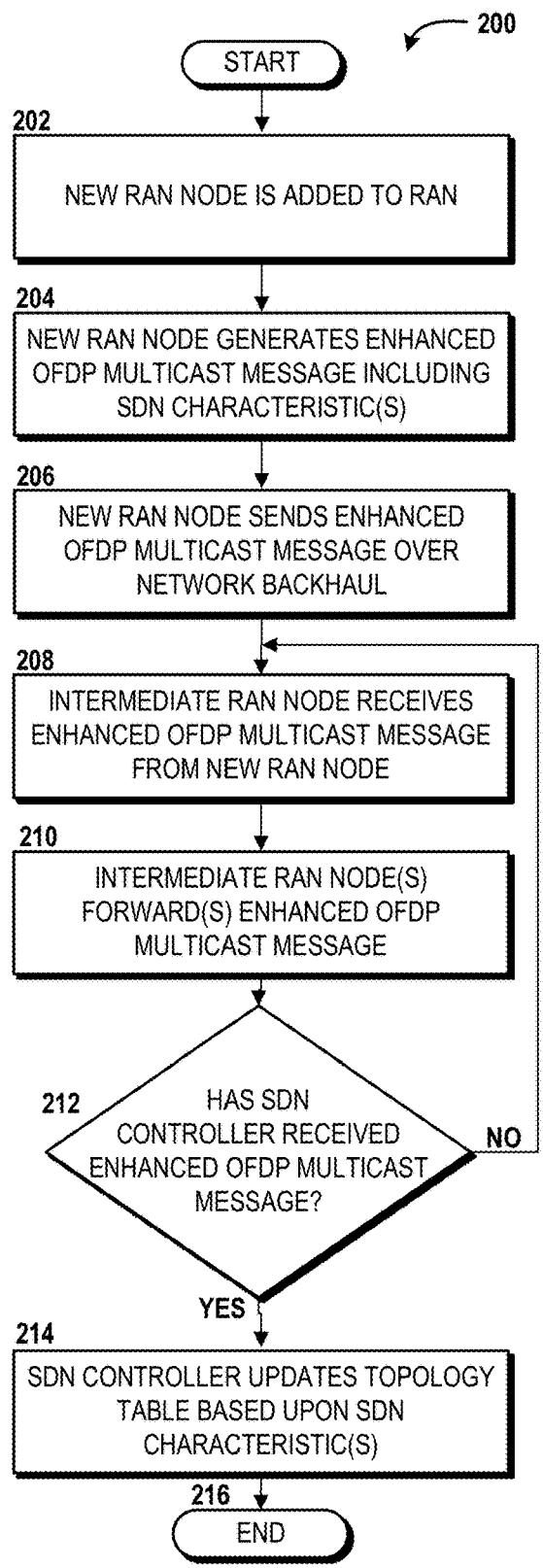
FIG. 2 is a flow diagram illustrating aspects of a method for implementing multi-hop small cell auto discovery for SDN-enabled RAN, according to an illustrative embodiment.

Turning now to FIG. 2, a method 200 for implementing multi-hop small cell auto discovery for a SDN-enabled RAN, such as one of the RANs 104, will be described, according to an illustrative embodiment. It should be understood that the operations of the illustrative methods disclosed herein are not necessarily presented in any particular order and that performance of some or all of the operations in an alternative order(s) is possible and is contemplated. The operations have been presented in the demonstrated order for ease of description and illustration. Operations may be combined, separated, added, omitted, modified, and/or performed simultaneously or in another order without departing from the scope of the subject disclosure.

It also should be understood that the illustrated methods can be ended at any time and need not be performed in their entirety. Some or all operations of the methods, and/or substantially equivalent operations, can be performed by execution of computer-executable instructions included on a computer-readable storage media, as defined below. The term "computer-executable instructions," and variants thereof, as used in the description and claims, is used expansively herein to include routines, application programs, software, application modules, program modules, components, data structures, algorithms, and the like. Computer-executable instructions can be implemented on various system configurations, including single-processor or multi-processor systems, distributed computing systems, mini-computers, mainframe computers, personal computers, hand-held computing devices, microprocessor-based, programmable consumer electronics, network nodes, combinations thereof, and the like.

Thus, it should be appreciated that the logical operations described herein may be implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

Figure 4:
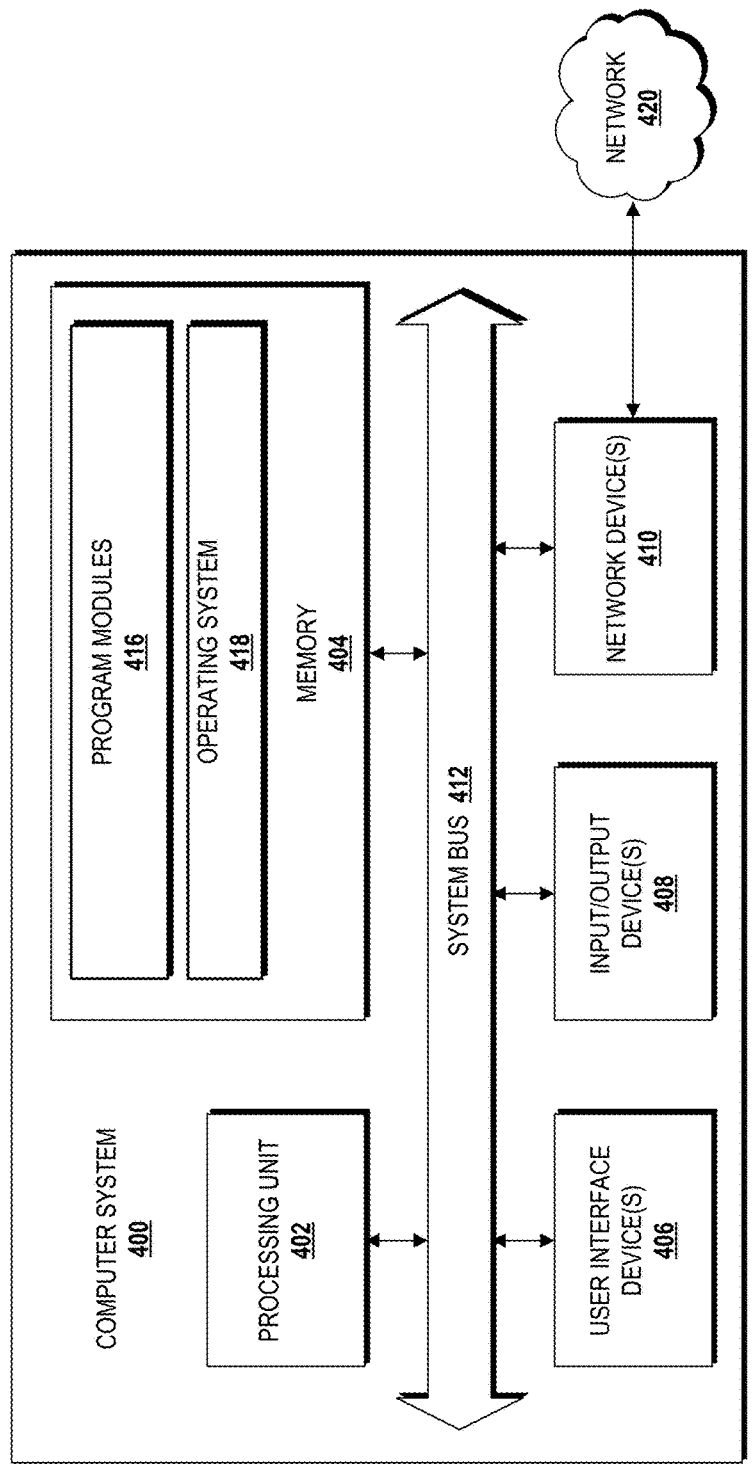
FIG. 4 is a block diagram illustrating an example computer system capable of implementing aspects of the embodiments presented herein.

The method 200 includes operations performed by RAN nodes, such as the macro cell node A 114, one or more small cell RAN nodes of the plurality of small cell RAN nodes 116A-116E, the SDN controller 108 via execution, by one or more processors, of one or more software program modules or applications (best shown in FIG. 4). The method 200 will be described with additional reference to FIG. 1.

The method 200 begins and proceeds to operation 202, where a new RAN node, such as the small cell RAN node a6 116F, is added to the RAN 104. From operation 202, the method 200 proceeds to operation 204, where the new RAN node generates a multicast IP message, such as the enhanced OFDP multicast message 122 including the SDN characteristics 124. From operation 204, the method 200 proceeds to operation 206, where the new RAN node sends the enhanced OFDP multicast message 122 over a network backhaul, such as the wired backhaul 118 and/or the wireless backhaul 120 to an intermediate RAN node, such as the small cell RAN node a5 116E.

From operation 206, the method 200 proceeds to operation 208, where the intermediate RAN node receives the enhanced OFDP multicast message 122 from the new RAN node. From operation 208, the method 200 proceeds to operation 210, where the intermediate RAN node (only one in this example, but can be for each intermediate RAN node) forwards the enhanced OFDP multicast message 122.

From operation 210, the method 200 proceeds to operation 212, where the SDN controller 108 determines whether the enhanced OFDP multicast message 122 has been received. If not, the method 200 returns to operation 208. If, however, the SDN controller 108 determines that the enhanced OFDP multicast message 122 has been received, then the enhanced OFDP multicast message 122 has made all hops and, accordingly, the method 200 proceeds to operation 214. At operation 214, the SDN controller 108 updates a topology table, such as the topology table 128, based upon the SDN characteristics 124 included in the enhanced OFDP multicast message 122. From operation 214, the method 200 proceeds to operation 216. The method 200 ends at operation 216.

Figure 3:
FIG. 3 is a table illustrating aspects of a RAN topology for use by a SDN controller, according to an illustrative embodiment.

Turning now to FIG. 3, the topology table 128 is illustrated with example data representative of a RAN topology, such as a topology of the RAN 104, for use by a SDN controller, such as the SDN controller 108, will be described, according to an illustrative embodiment. The illustrated topology table 128 includes a plurality of columns and a plurality of rows. The plurality of columns include an identifier ("ID") column 300, a topology profile column 302, an IP address column 304, a topology backhaul characteristics column 306, a status column 308, and other SDN characteristics column 310. The ID column 300 can include IDs for each RAN node in the topology. The topology profile column 302 can include a topology profile for each RAN node in the topology. The IP address column 304 can include an IP address for each RAN node in the topology. The topology backhaul characteristics column 306 can identify the backhaul technology type(s), frequency range, and other characteristics of the backhaul utilized by each RAN node in the topology. The status column 308 can include a status indicative of whether each RAN node in the topology is "ON" indicative of the RAN node currently operating within the RAN or "OFF" indicative of the RAN node not currently operating within the RAN. The other SDN characteristics column 310 can include location, power, and any other SDN characteristics associated with each RAN node in the topology.

In the illustrated embodiment, a first row 312 includes data associated with the macro node A 114; a second row 314 includes data associated with the small cell node a4 116D; a third row 316 includes data associated with the small cell node a3 116C; and a fourth row 318 includes data associated with the small cell node a6 116F. In implementation, the topology table 128 can include data associated with each RAN node in the topology. When a new RAN node is added to the RAN topology, the SDN controller 108 can receive an enhanced OFDP multicast message that includes SDN characteristics for the new RAN node and can update the topology table 128 to include the SDN characteristics. For example, when the small cell node a6 116F is added to the RAN topology, the SDN controller 108 can update the topology table 128 to include the SDN characteristics 124 included in the enhanced OFDP multicast message 122.

FIG. 4 is a block diagram illustrating a computer system 400 configured to provide the functionality in accordance with various embodiments of the concepts and technologies disclosed herein. In some implementations, the UEs 102, components of the RANs 104-104N, components of the EPC network 106, the SDN controller 108, one or more of the plurality of RAN nodes 112 or portions thereof, other components described herein, or any combination thereof can utilize an architecture that is the same as or similar to the architecture of the computer system 400, or a modified version thereof. It should be understood, however, that modification to the architecture may be made to facilitate certain interactions among elements described herein.

The computer system 400 includes a processing unit 402, a memory 404, one or more user interface devices 406, one or more input/output ("I/O") devices 408, and one or more network devices 410, each of which is operatively connected to a system bus 412. The bus 412 enables bi-directional communication between the processing unit 402, the memory 404, the user interface devices 406, the I/O devices 408, and the network devices 410.

The processing unit 402 may be a standard central processor that performs arithmetic and logical operations, a more specific purpose programmable logic controller ("PLC"), a programmable gate array, a system-on-a-chip, or other type of processor known to those skilled in the art and suitable for controlling the operation of the server computer. Processing units are generally known, and therefore are not described in further detail herein.

The memory 404 communicates with the processing unit 402 via the system bus 412. In some embodiments, the memory 404 is operatively connected to a memory controller (not shown) that enables communication with the processing unit 402 via the system bus 412. The memory 404 includes an operating system 418 and one or more program modules 416. The operating system 418 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 416 may include various software and/or program modules to perform the various operations described herein. The program modules 416 and/or other programs can be embodied in computer-readable media containing instructions that, when executed by the processing unit 402, perform the method 200 or at least a portion thereof, described in detail above with respect to FIG. 2.

According to embodiments, the program modules 416 may be embodied in hardware, software, firmware, or any combination thereof.

By way of example, and not limitation, computer-readable media may include any available computer storage media or communication media that can be accessed by the computer system 400. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 400. In the claims, the phrase "computer storage medium" and variations thereof does not include waves or signals per se and/or communication media.

The user interface devices 406 may include one or more devices with which a user accesses the computer system 400. The user interface devices 406 may include, but are not limited to, computers, servers, personal digital assistants, cellular phones, or any suitable computing devices. The I/O devices 408 enable a user to interface with the program modules 416. In one embodiment, the I/O devices 408 are operatively connected to an I/O controller (not shown) that enables communication with the processing unit 402 via the system bus 412. The I/O devices 408 may include one or more input devices, such as, but not limited to, a keyboard, a mouse, or an electronic stylus. Further, the I/O devices 408 may include one or more output devices, such as, but not limited to, a display screen or a printer.

The network devices 410 enable the computer system 400 to communicate with other networks or remote systems via a network 420, which can include, for example, the RANs 104-104N and the EPC network 106. Examples of the network devices 410 include, but are not limited to, a modem, a radio frequency ("RF") or infrared ("IR") transceiver, a telephonic interface, a bridge, a router, or a network card. The network 420 may include a wireless network such as, but not limited to, a wireless local area network ("WLAN"), a wireless wide area network ("WWAN"), a wireless personal area network ("WPAN") such as provided via BLUETOOTH technology, a wireless metropolitan area network ("WMAN") such as a WiMAX network or metropolitan cellular network. Alternatively, the network 420 may be a wired network such as, but not limited to, a wide area network ("WAN"), a wired LAN such as provided via Ethernet, a wired personal area network ("PAN"), or a wired metropolitan area network ("MAN").

Figure 5:
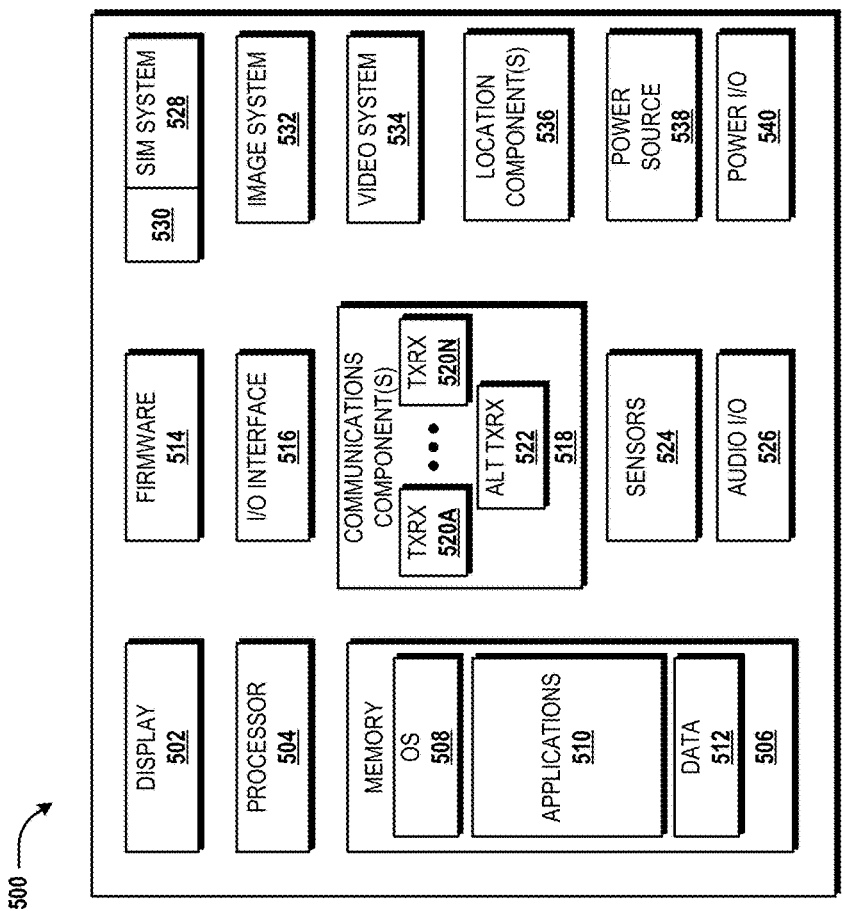
FIG. 5 is a block diagram illustrating an example mobile device capable of implementing aspects of the embodiments disclosed herein.

Turning now to FIG. 5, an illustrative mobile device 500 and components thereof will be described. In some embodiments, the UEs 102 described above with reference to FIG. 1 can be configured as and/or can have an architecture similar or identical to the mobile device 500 described herein in FIG. 5. It should be understood, however, that the UEs 102 may or may not include the functionality described herein with reference to FIG. 5. While connections are not shown between the various components illustrated in FIG. 5, it should be understood that some, none, or all of the components illustrated in FIG. 5 can be configured to interact with one other to carry out various device functions. In some embodiments, the components are arranged so as to communicate via one or more busses (not shown). Thus, it should be understood that FIG. 5 and the following description are intended to provide a general understanding of a suitable environment in which various aspects of embodiments can be implemented, and should not be construed as being limiting in any way.

As illustrated in FIG. 5, the mobile device 500 can include a display 502 for displaying data. According to various embodiments, the display 502 can be configured to display various graphical user interface ("GUI") elements, text, images, video, advertisements, prompts, virtual keypads and/or keyboards, messaging data, notification messages, metadata, internet content, device status, time, date, calendar data, device preferences, map and location data, combinations thereof, and the like. The mobile device 500 also can include a processor 504 and a memory or other data storage device ("memory") 506. The processor 504 can be configured to process data and/or can execute computer-executable instructions stored in the memory 506. The computer-executable instructions executed by the processor 504 can include, for example, an operating system 508, one or more applications 510, other computer-executable instructions stored in a memory 506, or the like. In some embodiments, the applications 510 also can include a UI application (not illustrated in FIG. 5).

The UI application can interface with the operating system 508 to facilitate user interaction with functionality and/or data stored at the mobile device 500 and/or stored elsewhere. In some embodiments, the operating system 508 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 504 to aid a user in entering content, viewing account information, answering/initiating calls, entering/deleting data, entering and setting user IDs and passwords for device access, configuring settings, manipulating address book content and/or settings, multimode interaction, interacting with other applications 510, and otherwise facilitating user interaction with the operating system 508, the applications 510, and/or other types or instances of data 512 that can be stored at the mobile device 500.

According to various embodiments, the applications 510 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 510, the data 512, and/or portions thereof can be stored in the memory 506 and/or in a firmware 514, and can be executed by the processor 504. The firmware 514 also can store code for execution during device power up and power down operations. It can be appreciated that the firmware 514 can be stored in a volatile or non-volatile data storage device including, but not limited to, the memory 506 and/or a portion thereof.

The mobile device 500 also can include an input/output ("I/O") interface 516. The I/O interface 516 can be configured to support the input/output of data such as location information, user information, organization information, presence status information, user IDs, passwords, and application initiation (start-up) requests. In some embodiments, the I/O interface 516 can include a hardwire connection such as USB port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 500 can be configured to synchronize with another device to transfer content to and/or from the mobile device 500. In some embodiments, the mobile device 500 can be configured to receive updates to one or more of the applications 510 via the I/O interface 516, though this is not necessarily the case. In some embodiments, the I/O interface 516 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 516 may be used for communications between the mobile device 500 and a network device or local device.

The mobile device 500 also can include a communications component 518. The communications component 518 can be configured to interface with the processor 504 to facilitate wired and/or wireless communications with one or more networks described above herein. In some embodiments, other networks include networks that utilize non-cellular wireless technologies such as WI-FI or WIMAX. In some embodiments, the communications component 518 includes a multimode communications subsystem for facilitating communications via the cellular network and one or more other networks.

The communications component 518, in some embodiments, includes one or more transceivers. The one or more transceivers, if included, can be configured to communicate over the same and/or different wireless technology standards with respect to one another. For example, in some embodiments one or more of the transceivers of the communications component 518 may be configured to communicate using GSM, CDMA, CDMAONE, CDMA2000, LTE, and various other 2G, 2.5G, 3G, 4G, 5G and greater generation technology standards. Moreover, the communications component 518 may facilitate communications over various channel access methods (which may or may not be used by the aforementioned standards) including, but not limited to, TDMA, FDMA, W-CDMA, OFDM, SDMA, and the like.

In addition, the communications component 518 may facilitate data communications using GPRS, EDGE, the HSPA protocol family, including HSDPA, EUL, or otherwise termed HSUPA, HSPA+, and various other current and future wireless data access standards. In the illustrated embodiment, the communications component 518 can include a first transceiver ("TxRx") 520A that can operate in a first communications mode (e.g., GSM). The communications component 518 also can include an $N^{th}$ transceiver ("TxRx") 520N that can operate in a second communications mode relative to the first transceiver 520A (e.g., UMTS). While two transceivers 520A-N (hereinafter collectively and/or generically referred to as "transceivers 520") are shown in FIG. 5, it should be appreciated that less than two, two, and/or more than two transceivers 520 can be included in the communications component 518.

The communications component 518 also can include an alternative transceiver ("Alt TxRx") 522 for supporting other types and/or standards of communications. According to various contemplated embodiments, the alternative transceiver 522 can communicate using various communications technologies such as, for example, WI-FI, WIMAX, BLUETOOTH, infrared, IRDA, NFC, other RF technologies, combinations thereof, and the like.

In some embodiments, the communications component 518 also can facilitate reception from terrestrial radio networks, digital satellite radio networks, internet-based radio service networks, combinations thereof, and the like. The communications component 518 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 500 also can include one or more sensors 524. The sensors 524 can include temperature sensors, light sensors, air quality sensors, movement sensors, orientation sensors, noise sensors, proximity sensors, or the like. As such, it should be understood that the sensors 524 can include, but are not limited to, accelerometers, magnetometers, gyroscopes, infrared sensors, noise sensors, microphones, combinations thereof, or the like. Additionally, audio capabilities for the mobile device 500 may be provided by an audio I/O component 526. The audio I/O component 526 of the mobile device 500 can include one or more speakers for the output of audio signals, one or more microphones for the collection and/or input of audio signals, and/or other audio input and/or output devices.

The illustrated mobile device 500 also can include a subscriber identity module ("SIM") system 528. The SIM system 528 can include a universal SIM ("USIM"), a universal integrated circuit card ("UICC") and/or other identity devices. The SIM system 528 can include and/or can be connected to or inserted into an interface such as a slot interface 530. In some embodiments, the slot interface 530 can be configured to accept insertion of other identity cards or modules for accessing various types of networks. Additionally, or alternatively, the slot interface 530 can be configured to accept multiple subscriber identity cards. Because other devices and/or modules for identifying users and/or the mobile device 500 are contemplated, it should be understood that these embodiments are illustrative, and should not be construed as being limiting in any way.

The mobile device 500 also can include an image capture and processing system 532 ("image system"). The image system 532 can be configured to capture or otherwise obtain photos, videos, and/or other visual information. As such, the image system 532 can include cameras, lenses, charge-coupled devices ("CCDs"), combinations thereof, or the like. The mobile device 500 may also include a video system 534. The video system 534 can be configured to capture, process, record, modify, and/or store video content. Photos and videos obtained using the image system 532 and the video system 534, respectively, may be added as message content to a multimedia message service ("MMS") message, email message, and sent to another mobile device. The video and/or photo content also can be shared with other devices via various types of data transfers via wired and/or wireless communication devices as described herein.

The mobile device 500 also can include one or more location components 536. The location components 536 can be configured to send and/or receive signals to determine a geographic location of the mobile device 500. According to various embodiments, the location components 536 can send and/or receive signals from GPS devices, A-GPS devices, WI-FI/WIMAX and/or cellular network triangulation data, combinations thereof, and the like. The location component 536 also can be configured to communicate with the communications component 518 to retrieve triangulation data for determining a location of the mobile device 500. In some embodiments, the location component 536 can interface with cellular network nodes, telephone lines, satellites, location transmitters and/or beacons, wireless network transmitters and receivers, combinations thereof, and the like. In some embodiments, the location component 536 can include and/or can communicate with one or more of the sensors 524 such as a compass, an accelerometer, and/or a gyroscope to determine the orientation of the mobile device 500. Using the location component 536, the mobile device 500 can generate and/or receive data to identify its geographic location, or to transmit data used by other devices to determine the location of the mobile device 500. The location component 536 may include multiple components for determining the location and/or orientation of the mobile device 500.

The illustrated mobile device 500 also can include a power source 538. The power source 538 can include one or more batteries, power supplies, power cells, and/or other power subsystems including alternating current ("AC") and/or direct current ("DC") power devices. The power source 538 also can interface with an external power system or charging equipment via a power I/O component 540. Because the mobile device 500 can include additional and/or alternative components, the above embodiment should be understood as being illustrative of one possible operating environment for various embodiments of the concepts and technologies described herein. The described embodiment of the mobile device 500 is illustrative, and should not be construed as being limiting in any way.

Figure 6:
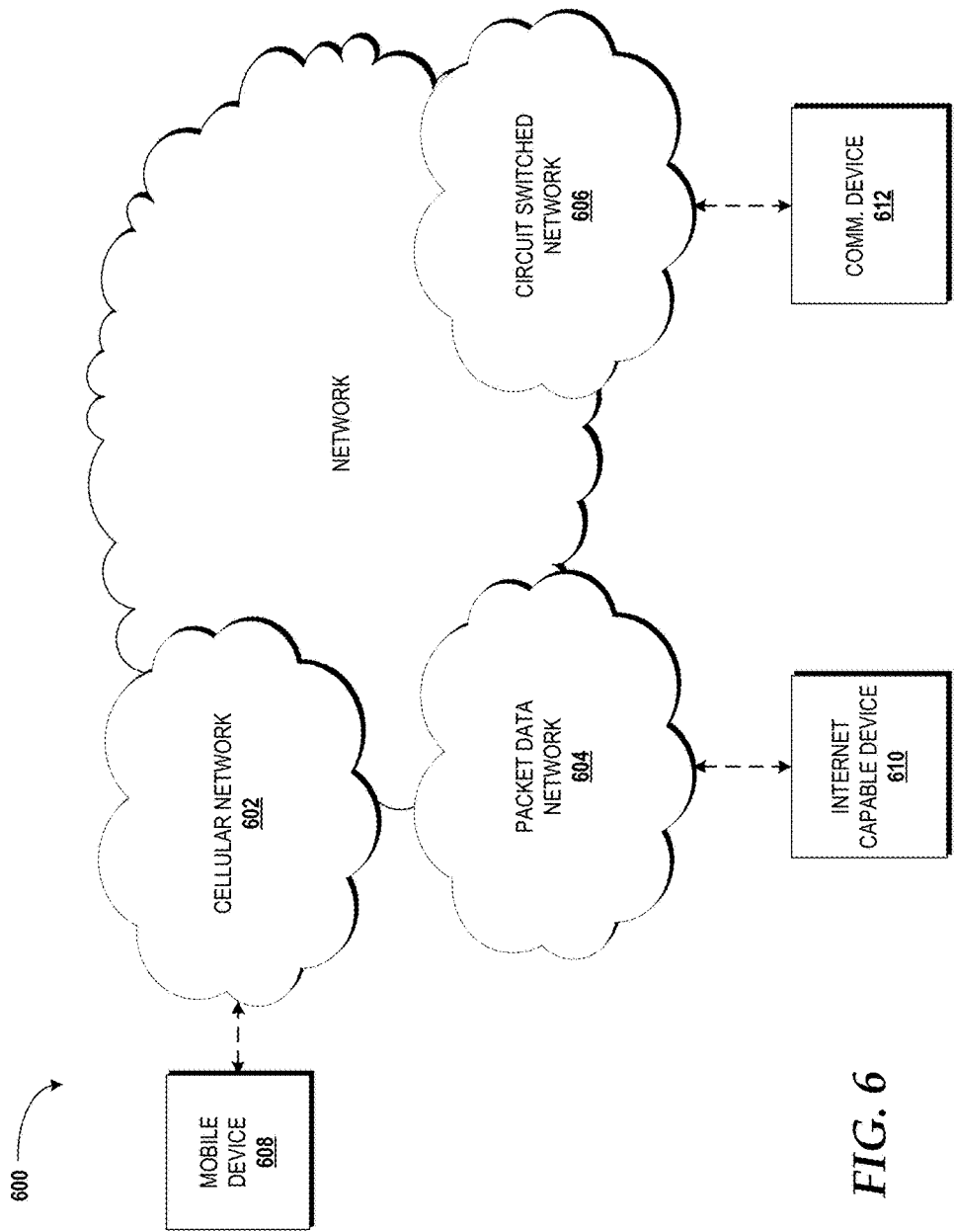
FIG. 6 schematically illustrates a network, according to an illustrative embodiment.

Turning now to FIG. 6, additional details of a network 600 are illustrated, according to an illustrative embodiment. The network 600 includes a cellular network 602, a packet data network 604, for example, the Internet, and a circuit switched network 606, for example, a publicly switched telephone network ("PSTN"). The cellular network 602 includes various components such as, but not limited to, RANs (e.g., the RANs 104-104N), BTSs, NodeBs or eNodeBs, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), the EPC network 106, EPC functions, the SDN controller 108, and the like. The cellular network 602 also includes radios and nodes for receiving and transmitting voice, data, and combinations thereof to and from radio transceivers, networks, the packet data network 604, and the circuit switched network 606.

A mobile communications device 608, such as, for example, a cellular telephone, a user equipment, a mobile terminal, a PDA, a laptop computer, a handheld computer, the UEs 102, and combinations thereof, can be operatively connected to the cellular network 602. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSUPA), and HSPA+. The cellular network 602 also is compatible with 4G mobile communications standards such as LTE, or the like, as well as evolved and future mobile standards, including those described herein above.

The packet data network 604 includes various devices, for example, servers, computers, databases, and other devices in communication with one another, as is generally known. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system (POTS). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, the UEs 102, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, the UEs 102, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network 600 is used to refer broadly to any combination of the networks 602, 604, 606. It should be appreciated that substantially all of the functionality described with reference to the network 600 can be performed by the cellular network 602, the packet data network 604, and/or the circuit switched network 606, alone or in combination with other networks, network elements, and the like.

Based on the foregoing, it should be appreciated that concepts and technologies have been disclosed herein for multi-hop small cell auto discovery for SDN-enabled RANs. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A software-defined networking ("SDN") controller comprising:
    a processor; and
    memory that stores instructions that, when executed by the processor, cause the processor to perform operations comprising
        receiving, over a network backhaul, from a new radio access network ("RAN") node of a plurality of RAN nodes operating as part of a RAN, an enhanced open flow discovery protocol ("OFDP") multicast message comprising an SDN characteristic, thereby representing a first attempt for the SDN characteristic to be provided to the SDN controller,
        receiving, over the network backhaul, from an intermediate RAN node of the plurality of RAN nodes operating as part of the RAN, the enhanced OFDP multicast message, which was forwarded by the intermediate RAN node in response to receiving the enhanced OFDP multicast message from the new RAN node, thereby representing a second attempt for the SDN characteristic to be provided to the SDN controller, and
        in response to receiving the enhanced OFDP multicast message from the new RAN node in the first attempt or the enhanced OFDP multicast message from the intermediate RAN node in the second attempt, updating a topology table based, at least in part, upon the SDN characteristic comprised in the enhanced OFDP multicast message.

2. The SDN controller of claim 1, wherein the network backhaul comprises a plurality of wired backhaul links.

3. The SDN controller of claim 1, wherein the network backhaul comprises a plurality of wireless backhaul links.

4. The SDN controller of claim 1, wherein the operations further comprise receiving, over the network backhaul, from a further intermediate RAN node of the plurality of RAN nodes operating as part of the RAN, the enhanced OFDP multicast message, which was forwarded by the further intermediate RAN node in response to receiving the enhanced OFDP multicast message from the new RAN node, thereby representing a third attempt for the SDN characteristic to be provided to the SDN controller; and wherein updating the topology table based, at least in part, upon the SDN characteristic comprised in the enhanced OFDP multicast message is further in response to receiving the enhanced OFDP multicast message from the further intermediate RAN node in the third attempt.

5. The SDN controller of claim 1, wherein the new RAN node comprises a small cell node.

6. The SDN controller of claim 5, wherein the intermediate RAN node comprises a macro cell node.

7. The SDN controller of claim 5, wherein the small cell node operates within a millimeter wave frequency spectrum.

8. A method comprising:
    receiving, by a software-defined networking ("SDN") controller comprising a processor, over a network backhaul, from a new radio access network ("RAN") node of a plurality of RAN nodes operating as part of a RAN, an enhanced open flow discovery protocol ("OFDP") multicast message comprising an SDN characteristic, thereby representing a first attempt for the SDN characteristic to be provided to the SDN controller;
    receiving, by the SDN controller, over the network backhaul, from an intermediate RAN node of the plurality of RAN nodes operating as part of the RAN, the enhanced OFDP multicast message, which was forwarded by the intermediate RAN node in response to receiving the enhanced OFDP multicast message from the new RAN node, thereby representing a second attempt for the SDN characteristic to be provided to the SDN controller, and
    in response to receiving the enhanced OFDP multicast message from the new RAN node in the first attempt or the enhanced OFDP multicast message from the intermediate RAN node in the second attempt, updating, by the SDN controller, a topology table based, at least in part, upon the SDN characteristic comprised in the enhanced OFDP multicast message.

9. The method of claim 8, wherein the network backhaul comprises a plurality of wired backhaul links.

10. The method of claim 8, wherein the network backhaul comprises a plurality of wireless backhaul links.

11. The method of claim 8, further comprise receiving, over the network backhaul, from a further intermediate RAN node of the plurality of RAN nodes operating as part of the RAN, the enhanced OFDP multicast message, which was forwarded by the further intermediate RAN node in response to receiving the enhanced OFDP multicast message from the new RAN node, thereby representing a third attempt for the SDN characteristic to be provided to the SDN controller; and wherein updating the topology table based, at least in part, upon the SDN characteristic comprised in the enhanced OFDP multicast message is further in response to receiving the enhanced OFDP multicast message from the further intermediate RAN node in the third attempt.

12. The method of claim 8, wherein the new RAN node comprises a small cell node.

13. The method of claim 12, wherein the intermediate RAN node comprises a macro cell node.

14. The method of claim 12, wherein the small cell node operates within a millimeter wave frequency spectrum.

15. A computer-readable storage medium having computer-executable instructions stored thereon that, when executed by a processor of a software-defined networking ("SDN") controller, cause the SDN controller to perform operations comprising:

receiving, over a network backhaul, from a new radio access network ("RAN") node of a plurality of RAN nodes operating as part of a RAN, an enhanced open flow discovery protocol ("OFDP") multicast message comprising an SDN characteristic, thereby representing a first attempt for the SDN characteristic to be provided to the SDN controller;

receiving, over the network backhaul, from an intermediate RAN node of the plurality of RAN nodes operating as part of the RAN, the enhanced OFDP multicast message, which was forwarded by the intermediate RAN node in response to receiving the enhanced OFDP multicast message from the new RAN node, thereby representing a second attempt for the SDN characteristic to be provided to the SDN controller; and in response to receiving the enhanced OFDP multicast message from the new RAN node in the first attempt or the enhanced OFDP multicast message from the intermediate RAN node in the second attempt, updating a topology table based, at least in part, upon the SDN characteristic comprised in the enhanced OFDP multicast message.

16. The computer-readable storage medium of claim 15, wherein the network backhaul comprises a plurality of wired backhaul links.

17. The computer-readable storage medium of claim 15, wherein the network backhaul comprises a plurality of wireless backhaul links.

18. The computer-readable storage medium of claim 15, wherein the operations further comprise receiving, over the network backhaul, from a further intermediate RAN node of the plurality of RAN nodes operating as part of the RAN, the enhanced OFDP multicast message, which was forwarded by the further intermediate RAN node in response to receiving the enhanced OFDP multicast message from the new RAN node, thereby representing a third attempt for the SDN characteristic to the SDN controller; and wherein updating the topology table based, at least in part, upon the SDN characteristic comprised in the enhanced OFDP multicast message is further in response to receiving the enhanced OFDP multicast message from the further intermediate RAN node in the third attempt.

19. The computer-readable storage medium of claim 15, wherein the new RAN node comprises a small cell node, and the intermediate RAN node comprises a macro cell node.

20. The computer-readable storage medium of claim 19, wherein the small cell node operates within a millimeter wave frequency spectrum.

* * * * *